US009170325B2

(12) United States Patent
Zhang et al.

(10) Patent No.: US 9,170,325 B2
(45) Date of Patent: Oct. 27, 2015

(54) DISTANCE MEASUREMENTS BETWEEN COMPUTING DEVICES

(75) Inventors: Zengbin Zhang, Linyi (SH); David Chiyuan Chu, Redmond, WA (US); Thomas Moscibroda, Beijing (CN); Xiaomeng Chen, Shenyang (CN); Feng Zhao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 550 days.

(21) Appl. No.: 13/599,823

(22) Filed: Aug. 30, 2012

(65) Prior Publication Data

US 2014/0064034 A1    Mar. 6, 2014

(51) Int. Cl.
*G01S 3/80* (2006.01)
*G01S 11/14* (2006.01)

(52) U.S. Cl.
CPC ........................................ *G01S 11/14* (2013.01)

(58) Field of Classification Search
CPC ........................................................ G01S 11/14
USPC ......................................................... 367/127
See application file for complete search history.

(56) References Cited

U.S. PATENT DOCUMENTS

| | | | | |
|---|---|---|---|---|
| 5,920,278 | A * | 7/1999 | Tyler et al. | 342/33 |
| 6,525,993 | B2 * | 2/2003 | Wake et al. | 367/127 |
| 7,076,259 | B2 | 7/2006 | Belcea | |
| 7,221,622 | B2 * | 5/2007 | Matsuo et al. | 367/125 |
| 7,529,542 | B1 | 5/2009 | Chevion et al. | |
| 7,701,998 | B2 * | 4/2010 | Oppermann | 375/141 |
| 7,780,522 | B2 | 8/2010 | Lutnick et al. | |
| 8,660,072 | B2 * | 2/2014 | Siomina et al. | 370/329 |
| 2001/0019516 | A1 * | 9/2001 | Wake et al. | 367/127 |
| 2007/0190494 | A1 | 8/2007 | Rosenberg | |
| 2008/0089393 | A1 * | 4/2008 | Opperman | 375/141 |
| 2009/0270042 | A1 | 10/2009 | Miscopein et al. | |
| 2010/0113161 | A1 | 5/2010 | Walker et al. | |
| 2011/0176499 | A1 * | 7/2011 | Siomina et al. | 370/329 |
| 2014/0064034 | A1 * | 3/2014 | Zhang et al. | 367/127 |

OTHER PUBLICATIONS

Zhang et al,SwordFight: Enabling a New Class of Phone-to-Phone Action Games on Commodity Phones, 14 pages, Jun. 2012.*
Beigbeder, et al., "The Effects of Loss and Latency on User Performance in Unreal Tournament 2003", <<http://www.student.oulu.fi/~karivatj/References/The%20Effects%20of%20Loss%20and%20Latency%20on%20User%20Performance%20in%20Unreal%20Tournament%202003.pdf>>, SIGCOMM Workshops, Aug.-Sep. 2004, pp. 144-151.

(Continued)

*Primary Examiner* — Daniel Pihulic
(74) *Attorney, Agent, or Firm* — Micah P. Goldsmith; Judy Yee; Micky Minhas

(57) ABSTRACT

Some implementations provide techniques and arrangements for distance measurements between computing devices. Some examples determine a distance between devices based at least in part on a propagation time of audio tones between the devices. Further, some examples determine the arrival time of the audio tones by performing autocorrelation on streaming data corresponding to recorded sound to determine a timing of an autocorrelation peak indicative of a detection of an audio tone in the streaming data. In some cases, cross correlation may be performed on the streaming data in a search window to determine a timing of a cross correlation peak indicative of the detection of the audio tone in the streaming data. The location of the search window in time may be determined based at least in part on the timing of the detected autocorrelation peak.

20 Claims, 8 Drawing Sheets

(56) References Cited

OTHER PUBLICATIONS

Bian, et al., "Using Sound Source Localization in a Home Environment", Proceedings of the 3rd International Conference on Pervasive Computing (Pervasive), LNCS 3468, May 2005, pp. 19-36.

Biscotti, et al., "Market Trends: Gaming Ecosystem, 2011", <<http://www.gartner.com/id=1724014>>, Gartner, Inc., Market Analysis and Statistics, 2011, 2 pages.

Butterworth, "On the Theory of Filter Amplifiers", <<http://www.changpuak.ch/electronics/downloads/On_the_Theory_of_Filter_Amplifiers.pdf>>, Wireless Engineer, vol. 7, Oct. 1930, pp. 536-541.

"Distance between two android phones", retrieved on Mar. 21, 2012 at <<http://stackoverflow.com/questions/4284402/distance-between-two-android-phones>>, 2 pages.

Girod et al.; "A Self-Calibrated Distributed Acoustic Sensing Platform"; Nov. 2006; pp. 335-336; http://delivery.acm.org/10.1145/1190000/1182841/p335-girod.pdf?ip=151.207.250.71&id=1182841&acc=ACTIVE %20SERVICE&key=C15944E53D0ACA63%2E4D4702B0C3E38B35%2E4D4702B0C3E38B35%2E4D4702B0C3E38B35&CFID=693177867&CFTOKEN=30975193&__acm__=1436897982_3a6d0b847c7ba303deb8c8d4872a361b.

Girod, et al., "The Design and Implementation of a Self-Calibrating Distributed Acoustic Sensing Platform", <<http://escholarship.org/uc/item/0465g4pc.pdf>>, Proceedings of the 4th International Conference on Embedded Networked Sensor Systems (SenSys), Nov. 2006, pp. 71-84.

Harter, et al., "The Anatomy of a Context-Aware Application", <<http://www.cl.cam.ac.uk/research/dtg/Ice-pub/public/files/tr.2002.2.pdf>>, Wireless Networks—Selected Papers from Mobicom'99, vol. 8, No. 2-3, Mar.-May 2002, pp. 187-197.

Hazas,et al., "Broadband Ultrasonic Location Systems for Improved Indoor Positioning", <<http://ieeexplore.ieee.org/stamp/stamp.jsp?arnumber=01610595>>, IEEE Transactions on Mobile Computing, vol. 5, No. 5, May 2006, pp. 536-547.

Jones, et al., "Human Hand Function", Oxford University Press, 2006.

Kushwaha, et al., "Sensor Node Localization Using Mobile Acoustic Beacons", <<http://www.math.u-szeged.hu/tagok/mmaroti/pdf/2005%20Localization%20using%20mobile%20beacons.pdf>>, IEEE International Conference on Mobile Adhoc and Sensor Systems (MASS), Nov. 2005, 9 pages.

LaMarca, et al., "Location Systems: An Introduction to the Technology Behind Location (Synthesis Lectures on Mobile and Pervasive Computing)", Morgan and Claypool Publishers, 2008, 122 pages.

Lopes, et al., "Localization of Off-the-Shelf Mobile Devices Using Audible Sound: Architectures, Protocols and Performance Assessment", <<http://luci.ics.uci.edu/websiteContent/weAreLuci/biographies/faculty/djp3/LocalCopy/p38-lopez(2).pdf>>, Mobile Computing and Communications Review, vol. 10, No. 2, Apr. 2006, pp. 38-50.

Nintendo Wii, <<http://www.nintendo.com/wii>>, 2012, 3 pages.

Peng, et al., "BeepBeep: A High Accuracy Acoustic Ranging System using COTS Mobile Devices", <<http://www.cs.ucla.edu/~chunyip/publications/sensys106-beepbeep.pdf>>, Proceedings of the 5th International Conference on Embedded Networked Sensor Systems (SenSys), Nov. 2007, 14 pages.

Peng, et al., "Point&Connect: Intention-based Device Pairing for Mobile Phone Users", <<http://cs.ucla.edu/wing/publication/papers/p137-peng.pdf>>, Proceedings of the 7th International Conference on Mobile Systems, Applications, and Services (MobiSys), Jun. 2009, pp. 137-149.

Priyantha, et al., "The Cricket Location-Support System", <<http://nms.lcs.mit.edu/papers/cricket.pdf>>, Proceedings of the 6th ACM International Conference on Mobile Computing and Networking (MOBICOM), Aug. 2000, pp. 32-34.

Qui, et al., "On the Feasibility of Real-Time Phone-to-Phone 3D Localization", <<http://research.microsoft.com/pubs/157034/sensys_2011.pdf>>, Proceedings of the 9th ACM International Conference on Embedded Networked Sensor Systems (SenSys), Nov. 2011, pp. 190-203.

Scott, et al., "Audio Location: Accurate Low-Cost Location Sensing", <<http://luci.ics.uci.edu/websiteContent/weAreLuci/biographies/faculty/djp3/LocalCopy/audiolocation-pervasive2005.pdf>>, Proceedings of the 3rd International Conference on Pervasive Computing (Pervasive), 2005, 18 pages.

Whitehouse, et al., "Calibration as Parameter Estimation in Sensor Networks", <<http://www.cs.virginia.edu/~whitehouse/research/calibration/whitehouse02calibration.pdf>>, Proceedings of the 1st ACM International Workshop on Wireless Sensor Networks and Applications (WSNA), Sep. 2002, pp. 59-67.

\* cited by examiner

DISTANCE MEASUREMENTS BETWEEN COMPUTING DEVICES

BACKGROUND

The continued proliferation of computing devices, including mobile computing devices, has led to an increase in the availability of applications and other content used on these devices. For instance, users employ a variety of applications, such as games, digital media players, browsers, and the like, on an assortment of computing devices. As the number of computing devices and applications used on these devices continues to increase, users are ever more interested in enhancing their experiences while using these computing devices and applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide techniques and arrangements for distance measurements between computing devices, such as mobile computing devices. For example, some determine a distance between devices based at least in part on a propagation time of audio tones between the devices. Some determine the arrival time of the audio tones by performing autocorrelation on streaming data corresponding to recorded sound to determine a timing of an autocorrelation peak indicative of a detection of an audio tone in the streaming data and performing cross correlation on the streaming data in a search window to determine a timing of a cross correlation peak indicative of the detection of the audio tone in the streaming data, the location of the search window in time being determined based at least in part on the timing of the detected autocorrelation peak.

BRIEF DESCRIPTION OF THE DRAWINGS

The Detailed Description is described with reference to the accompanying figures. The use of the same reference numbers in different figures indicates similar or identical items.

DETAILED DESCRIPTION

Overview

Figure 1:
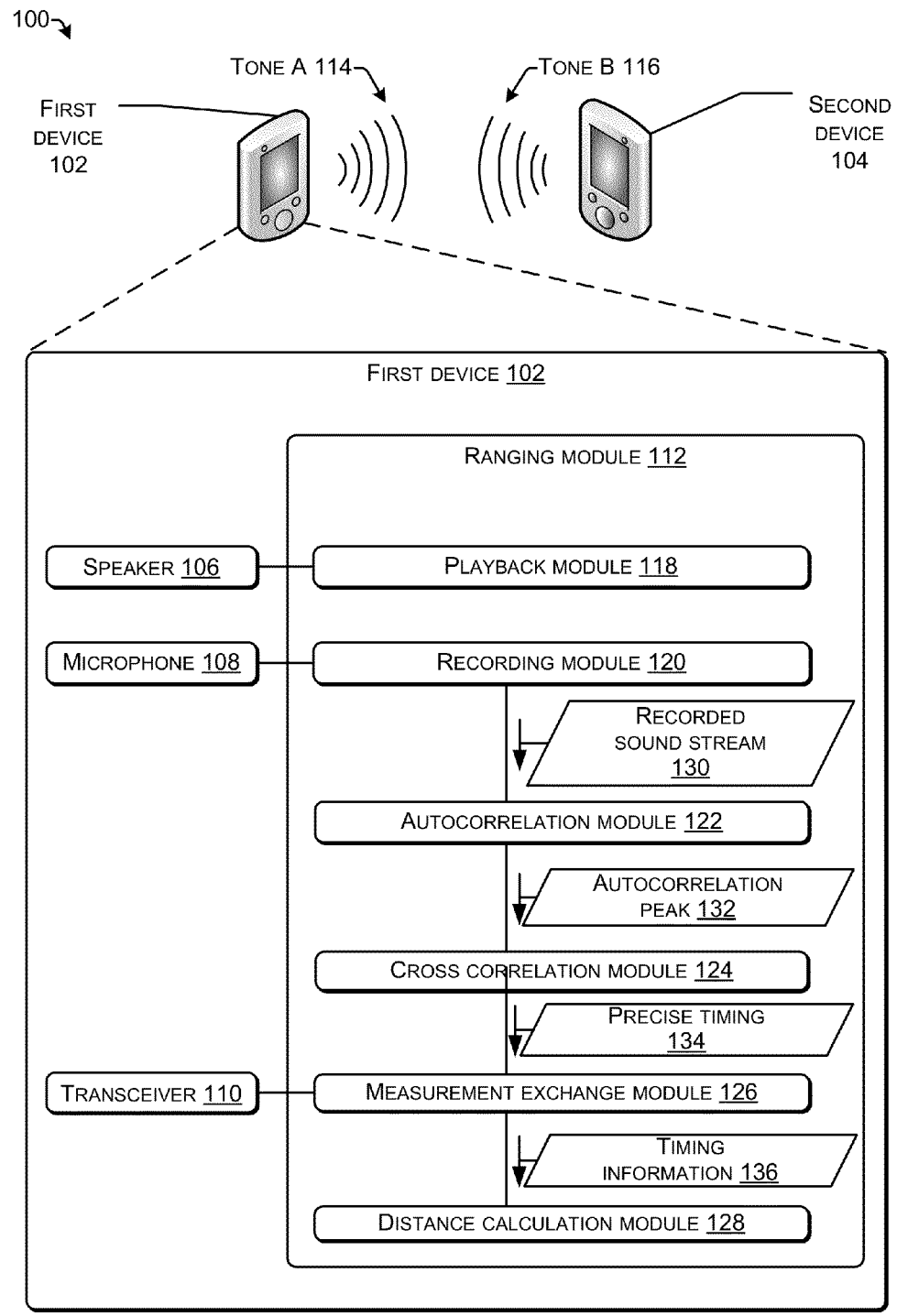
FIG. 1 illustrates an example system according to some implementations.

Some implementations herein enable a plurality of computing devices to continuously maintain an accurate measurement of distance between the devices. Such computing devices may include digital media devices and eBook readers; tablet computing devices; desktop, terminal and workstation computing devices; smart phones and mobile devices; laptop and netbook computing devices; televisions, gaming systems and home electronic devices; or the like. In some examples herein, sound can be used for such distance measurements. Many conventional distance ranging protocols are based on the assumption that device positions remain static during the process of taking a measurement. For many applications, such as motion based games, this is not a valid assumption. Furthermore, if the devices are moving towards or apart from each other, other issues, such as Doppler effects, may affect measurement accuracy.

This disclosure includes techniques and arrangements for fast and accurate real-time distance measurements between computing devices. In some implementations, a system implements an algorithm which uses a combination of autocorrelation and cross-correlation to compute the distance between two devices. In addition or alternatively, some implementations use a pipelined streaming execution framework which performs multiple operations in parallel, such as recording of audio into an audio stream in parallel with the performance of correlation and distance computations on the recorded audio stream. Further, some implementations may implement techniques to mitigate Doppler effects and/or techniques to handle multi-path, ambient noise, and packet loss.

One example implementation may include, for example, a phone-to-phone mobile motion game (MMG), in which two players wield their phones, and try to "attack" each other. The rules can be varied, but in one instance, a player wins if the player makes an "attack gesture" while the player's phone is within a set distance of the opponent's phone, e.g., 20 cm. A game of this type relies on the ability to conduct fast, accurate, and robust distance measurements between the phones, so that, at any moment during play, both phones have precise distance information, i.e., both phones know how far they are apart from each other. Furthermore, the measurements may also be highly accurate, such as within less than a few centimeters, and may be robust in the face of movement and ambient or external noise.

Of course, it should be understood that, though this disclosure may describe the system and method in the context of such a game for ease of understanding, the system and method described herein are not limited to such uses and may be used in many other situations.

The distance measurement functionality described herein may be implemented at various levels in the software and hardware of computing systems. Such levels include the Operating System (OS) level, such as in the OS with or without application support, the application level, either separate from OS (i.e. stand-alone) or as a plug-in to the OS or a plug-in to another application and so forth.

It should also be noted that, for readability, interactions between modules may be described herein as signals, commands or the passage of data items, but it would be understood by one of ordinary skill in the art that such interactions may be implemented in various ways, such as by function calls between various program modules.

Example Implementations

FIG. 1 illustrates an example framework of a system 100 according to some implementations. System 100 includes a first device 102 and a second device 104. An exploded view of the first device 102 is shown below the devices and illustrates the first device 102 as a logical system made up of a speaker 106, a microphone 108, a transceiver 110, and a ranging module 112. Although not shown, in some implementations, the second device 104 includes the same or similar components as the first device 102.

Viewing the operation of the system 100 at this depth, the first device 102 and second device 104 output tone A 114 and tone B 116 respectively from their speakers 106 and record sound at microphones 108. The recorded sound is input to the ranging module 112. The ranging module 112 of each device processes the recorded sound to detect the tone A 114 or B 116 output by the speaker of the other device to determine the time that the tone A 114 or tone B 116 that was received. The devices 102 and 104 then exchange the determined times via the transceiver 110 of devices 102 and 104. The ranging module 112 of each device then uses the exchanged times to determine the distance between the first device 102 and the second device 104. The determination of distance may also be based on the time at which the first device 102 and the second device 104 output tone A 114 and tone B 116, respectively. In some implementations, the first device 102 and second device 104 each store the time at which a command was issued to output tone A 114 or tone B 116. In other implementations, the first device 102 and the second device 104 may each detect the reception of both tone A 114 and tone B 116 at its respective microphone 108. Such implementations are useful in many situations, for example, where the devices have unpredictable delays or lag times from the issuance of a command to output a tone until the actual output of the tone from the speaker.

Thus, while the users of the first device 102 and the second device 104 are operating their devices in a distance based application, such as the phone-to-phone mobile motion game discussed above, the devices 102 and 104 repeatedly determine distance between the devices based on the exchanged tones to allow the distance based application to operate.

The ranging module 112 includes a playback module 118, a recording module 120, an autocorrelation module 122, a cross-correlation module 124, a measurement exchange module 126, and a distance calculation module 128. While the ranging module 112 is illustrated as including these separate modules, implementations are not so limited and may be implemented as any number of modules and hardware components. As such, the logical arrangements illustrated herein may be implemented as several components of hardware each configured to perform one or more functions, may be implemented in software or firmware where one or more programs are used to perform the different functions, or may be a combination of hardware, firmware, and/or software. For purposes of discussion, the modules described herein will be discussed as a set of software routines stored in a computer readable storage medium.

In operation, the playback module 118 and recording module 120 control the operations of the speaker 106 and microphone 108 to output the tone A 114 and tone B 116 and record sound including the tones. The sound that is recorded by the microphone 108 is received by the recording module 120 and passed to the autocorrelation module 122 as recorded sound stream 130.

In some implementations, tones A 114 and B 116 each include two copies of a respective pseudorandom sequence. In other words, tone A 114 is composed of a first pseudorandom sequence followed immediately by an exact copy of the first pseudorandom sequence. Tone B 116 is similarly composed of a second pseudorandom sequence followed immediately by an exact copy of the second pseudorandom sequence. Where the length of a tone is L seconds, the autocorrelation module 122 operates by correlating a sliding window of the recorded audio stream 130 L/2 seconds wide such that autocorrelation is performed on the most recent L/2 seconds of the recorded audio stream 130 with a L/2 seconds length portion of a delayed sound stream that a copy of the recorded audio stream 130 that is delayed by L/2 seconds. The autocorrelation module 122 determines the time that the correlation peaks and outputs the time to the cross correlation module 124 as autocorrelation peak 132. It should also be noted that the use of different pseudorandom sequences for tone A 114 and tone B 116 provides an additional benefit in that it allows for tone loss detection. Specifically, in systems in which the first device 102 and the second device 104 each detect the reception of both tone A 114 and tone B 116 at its respective microphone 108, if a device detects the same tone consecutively, it will be able to determine that it has lost at least one tone that may have occurred there between. Further tone loss detection capabilities may be provided by implementing the system to use four (or more) tones instead of two. In other words, systems may alternate such that a first distance measurement may be made based on an exchange of tone A 114 and tone B 116 and a second distance measurement may be made based on an exchange of a tone A' and a tone B' and then repeating the exchange of tone A 114 and tone 116 and so on.

Figure 2:
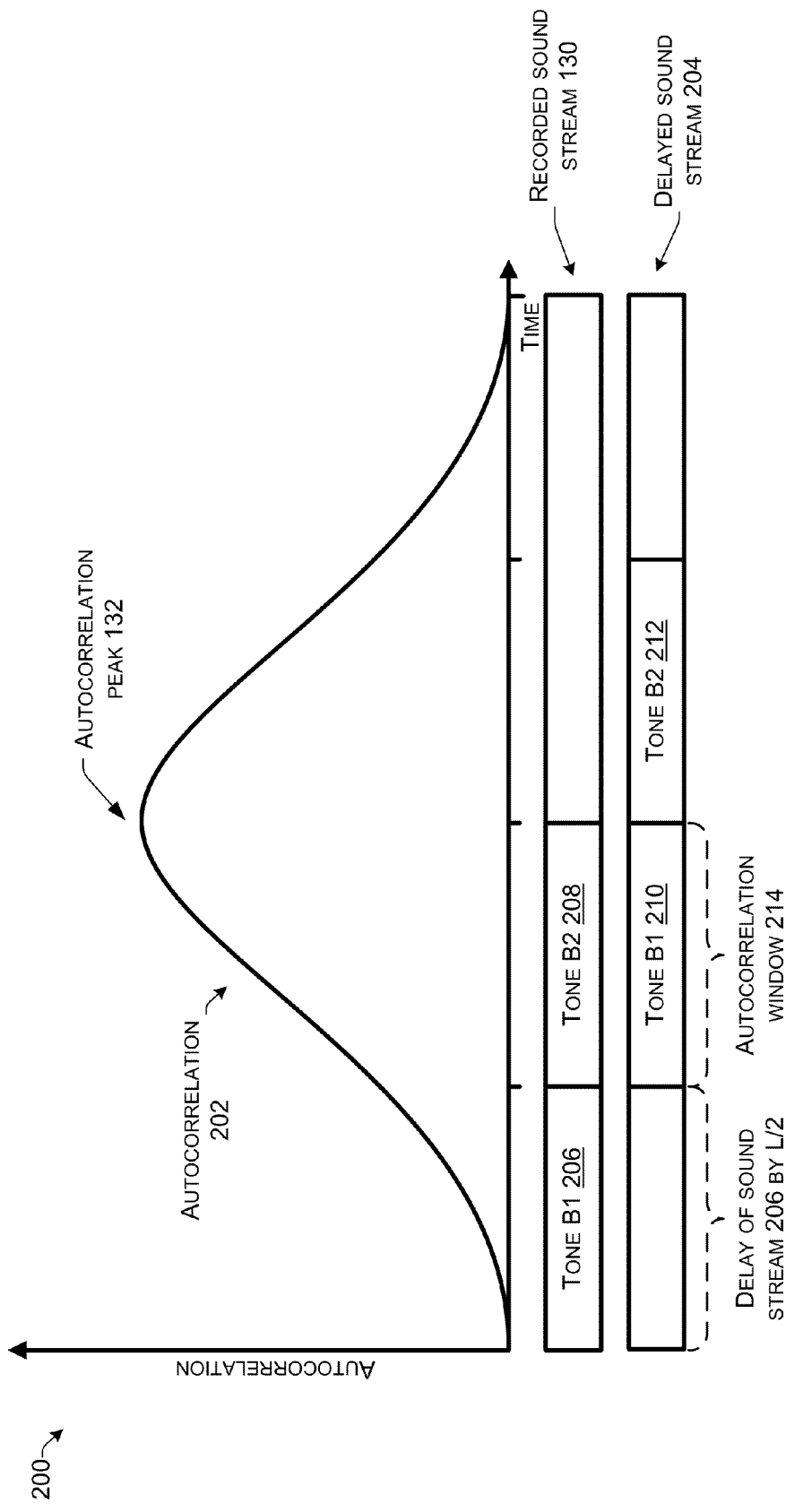
FIG. 2 illustrates an example graph which charts the autocorrelation determined by some implementations.

FIG. 2 illustrates a graph 200 of the timing of the operation of autocorrelation module 122 according to some implementations and, in particular, charts the autocorrelation 202 calculated by the autocorrelation module 122. The autocorrelation 202 indicates the correlation between the recorded sound stream 130 and a delayed sound stream 204. In particular, as the recorded sound stream 130 is received, the stream is copied and stored as the delayed sound stream 204, which as stated above is delayed by L/2 seconds relative to the recorded sound stream 130. Thus, as the recorded sound stream 130 is recorded, the first and second halves of tone B in the recorded sound stream 130, i.e. tone B1 206 and tone B2 208, are duplicated and stored as tone B1 210 and tone B2 212 of the delayed sound stream 204.

During operation, the autocorrelation module 122 correlates respective L/2 length portions of the recorded sound stream 130 and delayed sound stream 204 that are within the autocorrelation window 214 at each unit of time, i.e. the autocorrelation is determined for each of a plurality of iterations. In FIG. 2, tone B2 208 of the recorded sound stream 130 and tone B1 210 of the delayed sound stream 204 are in the autocorrelation window 214. As can be seen in FIG. 2, in the iterations corresponding to the moments leading up to the autocorrelation window 214 being positioned as shown in FIG. 2, i.e. as the autocorrelation window 214 slid to the right with each passing unit of time, the autocorrelation 202 has risen. When the autocorrelation window 214 is at the point shown in FIG. 2, the autocorrelation 202 peaks, identified as autocorrelation peak 132. This is because the portions of the recorded sound stream 130 and delayed sound stream 204, i.e. tone B2 208 tone B1 210, are matching copies of the same pseudorandom sequence and thus have a high correlation. In fact, ignoring distortions that occur in realistic situations, the correlation at this time may be seen as the maximum possible correlation. Following the occurrence of the autocorrelation peak 132 in FIG. 2, i.e. as the autocorrelation window 214 continues to slide to the right as with each passing unit of time, the autocorrelation 202 falls. The autocorrelation module 122 determines the time at which the autocorrelation 202 peaks, shown as autocorrelation peak 132, and passes this data to the cross correlation module 124.

The autocorrelation module 122 may calculate the autocorrelation value using the following equation:

$$R(L/2, t_0) = \frac{\sum_{t \in W} [X(t) - \overline{X(t)}] * [Y(t) - \overline{Y(t)}]}{\sqrt{\sum_{t \in W} [X(t) - \overline{X(t)}]^2 * \sum_{t \in W} [Y(t) - \overline{Y(t)}]^2}} \quad (1)$$

where $$\overline{X(t)} = \frac{\sum_{t \in W} X(t)}{L/2}, \overline{Y(t)} = \frac{\sum_{t \in W} Y(t)}{L/2}, \text{ and } W = \left[t_0 - \frac{L}{2} + 1, t_0\right], X(t)$$

being the recorded sound stream 130 and Y(t) being the delayed sound stream 204. As is apparent from previous discussions, the higher the autocorrelation value, i.e. R(L/2, $t_0$), the more closely the X(t) correlates to Y(t).

The above equation for R(L/2, $t_0$) can be expressed in a form that can be computed in linear time for the sliding autocorrelation window technique discussed above. In particular, the equation can be expressed as:

$$R(L/2, t_0) = \frac{\frac{L}{2} * \widehat{XY} - \hat{X} \cdot \hat{Y}}{\sqrt{\left[\frac{L}{2} * \widehat{XX} - \hat{X} \cdot \hat{X}\right] * \left[\frac{L}{2} * \widehat{YY} - \hat{Y} \cdot \hat{Y}\right]}} \quad (2)$$

where $$\widehat{XY} = \sum_{t \in W} [X(t) * Y(t)], \widehat{XX} = \sum_{t \in W} [X(t) * X(t)],$$

$$\widehat{YY} = \sum_{t \in W} [Y(t) * Y(t)], \hat{X} = \sum_{t \in W} X(t), \text{ and } \hat{Y} = \sum_{t \in W} Y(t).$$

The linear complexity computation works as follows. Take $X_\Sigma$ as an example, assuming its value at time $t_0$ is known, i.e. $X_\Sigma(t_0)$, then $$X_\Sigma(t_0 + 1) = \sum_{t_0 - \frac{L}{2} + 2}^{t_0 + 1} X(t) = \sum_{t_0 - \frac{L}{2} + 1}^{t_0} X(t) + X(t_0 + 1) - X\left(t_0 - \frac{L}{2} + 1\right) \quad (3)$$

$$= X_\Sigma(t_0) + X(t_0 + 1) - X\left(t_0 - \frac{L}{2} + 1\right)$$

Since $X(t_0+1)$, $$X\left(t_0 - \frac{L}{2} + 1\right),$$

and $X_\Sigma(t_0)$ are known, $X_\Sigma(t_0+1)$ is computed in O(1) time. The other variables can be updated in the same way. Thus, for any $t_0$, R(L/2, $t_0$) can be computed in O(1) time by sliding the autocorrelation window 214 along t using equation 3.

Furthermore, while the recorded sound stream 130 and the delayed sound stream 204 are shown as two separate streams in this example, other implementations are not so limited. For example, in some implementations, one copy of the recorded sound stream 130 may be kept and one or more memory pointers may be used to indicate the beginning and end of a virtual delayed sound stream without duplicating the recorded audio stream 130. This and other variations on the implementation of the particulars of the data storage would be apparent to one of ordinary skill in the art in view of the disclosure herein.

As stated above, once determined, the timing of the autocorrelation peak 132 is passed to the cross correlation module 124 by the autocorrelation module 122. The cross-correlation module 124 determines the precise timing of tone B by searching in a relatively small cross correlation search window around the autocorrelation peak 132 using cross-correlation. There are several reasons for using the cross correlation module 124 in addition to the autocorrelation module 122. First, auto-correlation fundamentally has a much flatter peak area. In other words, if a time slot's autocorrelation is high, its neighboring time slot's value is also high. Thus, a precise timing of the tone is difficult to determine. For this reason, the autocorrelation peak may be described as giving a "rough" timing estimate of the arrival time of the tone. Second, an offset can result due to signal distortion of the tone after propagation. Even in quiet environments, this can result in errors on the order of centimeters in the final result. Cross-correlation, on the other hand, is able to determine the time-of-arrival peak much more accurately in some implementations. For these reasons, in some implementations, cross correlation is performed on a search windows which is determined based on the result of the autocorrelation. This window is relatively small. This way, some implementations combine the benefits of cross correlation and autocorrelation.

In some implementations, the cross correlation module 124 operates by performing cross correlation on a predetermined number of L second long windows of the recorded sound stream 130 ending at evenly spaced points throughout the cross correlation search window. In some implementations, the correlation determined by the cross correlation module 124 is between the content of each of the L length windows and a reference copy of tone B 116. In such implementations, the reference copy of tone B 116 may be received from the second device 104 at the initialization of communication between the first device 102 and second device 104 by the distance based application. Alternatively, the reference copy of tone B 116 may be predetermined and "hard-coded" into the distance based application. Of course, other variations on the implementation of the particulars of how the reference copy of tone B 116 becomes known to the first device 102 would be apparent to one of ordinary skill in the art in view of the disclosure herein.

Figure 3:
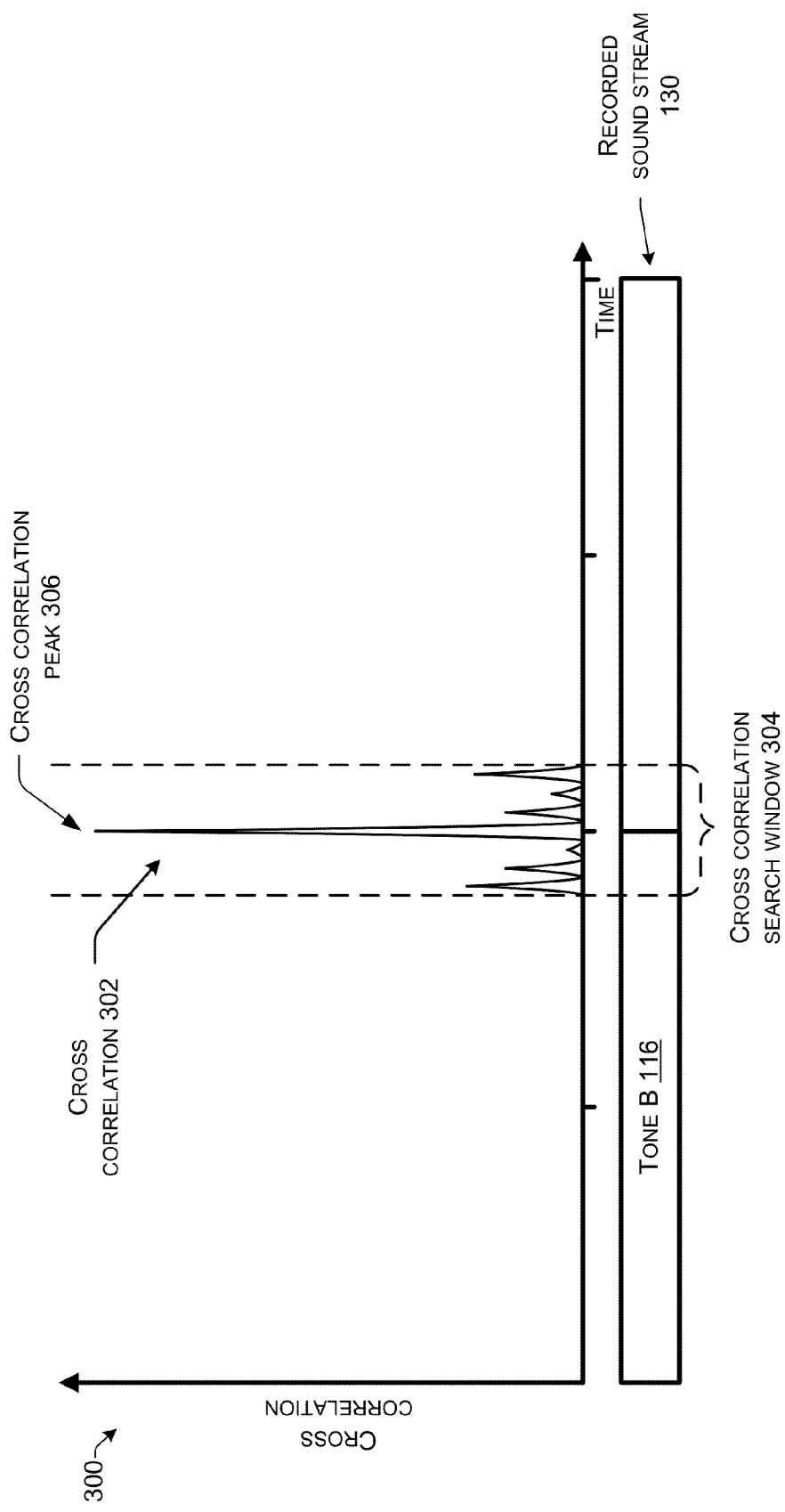
FIG. 3 illustrates an example graph which charts the cross correlation determined by some implementations.

FIG. 3 illustrates a graph 300 showing the timing of the operation of cross correlation module 124 and, in particular, charts the cross correlation 302 calculated by the cross correlation module 124. In particular, for each of a number of L second length windows of the recorded sound stream 130 ending at points spaced throughout the cross correlation search window 304, the cross correlation module 124 calculates the cross correlation 302 between the content of the L second window of the recorded sound stream 130 and a reference copy of tone B 116. Thus, as shown in FIG. 3, at the point in the cross correlation search window 304 corresponding to the end of the recorded tone B 116, a sharp cross correlation peak 306 occurs in the cross correlation 302 that indicates the "precise" timing of tone B 116. The cross correlation module 124 passes the precise timing that has been determined by the cross correlation module 124 to the measurement exchange module 126. Further, in cases where the autocorrelation module 122 finds a "false peak," i.e. an autocorrelation peak which does not actually correspond to the arrival of tone A 114 or tone B 116, the cross correlation module 124 may find no cross correlation peak 306 and can thereby prevent a false positive that would otherwise result from the use of the autocorrelation module 122 alone.

The cross correlation module 124 may calculate the cross correlation value using the following equation:

$$CC(t_0) = \frac{\sum_{t \in W}[X(t) - \overline{X(t)}] * [T(t - t_0) - \overline{T(t - t_0)}]}{\sqrt{\sum_{t \in W}[X(t) - \overline{X(t)}]^2 * \sum_{t=1-L}^{0}[T(t) - \overline{T(t)}]^2}} \quad (4)$$

where X(t) is the recorded sound stream 130, T(t), t∈[−L+1, 0] is the reference copy of the tone to be detected, $$\overline{X(t)} = \frac{\sum_{t \in W} X(t)}{L}, \overline{T(t)} = \frac{\sum_{t=1-L}^{0} T(t)}{L},$$

and W=[$t_0$−L+1, $t_0$].

As indicated above, the cross correlation module 124 passes the precise timing that has been determined by the cross correlation module 124 to the measurement exchange module 126. The measurement exchange module 126 controls the transceiver 110 to exchange the precise timing determined by the cross correlation module 124 with the other device and receives the precise time determined by the correlation module 124 of the ranging module 112 of the other device. Other information may be exchanged before, during, or after this time. The exchanged and determined information is then passed to the distance calculation module 128.

The distance calculation module 128 uses the exchanged and determined information to determine the distance between the first device 102 and second device 104.

The distance calculation module 128 may calculate the distance between the first device 102 and the second device 104 using the following equation:

$$d = \frac{1}{2} \cdot c \cdot ((t_{A2} - t_{B1}) - (t_{A1} - t_{B2})) \quad (5)$$

where c is the speed of sound, $t_{A1}$ is the time tone A is output by the speakers of the first device 102, $t_{A2}$ is the time tone A is determined to have been received by the microphone 108 of the second device 104, $t_{B1}$ is the time tone B is output by the speakers of the second device 104, and $t_{B2}$ is the time tone B is determined to have been received by the microphone 108 of the first device 102. In implementations in which each of the first device 102 and the second device 104 use autocorrelation and cross correlation to determine the precise arrival timing of both tone A 114 and tone B 116 at its own respective microphones, $t_{A1}$ and $t_{B1}$ can be the times at which tone A 114 and tone B 116 are determined to have been received at the microphone of the first device 102 and the microphone of the second device 104, respectively. In such implementations, some portion of the calculation may be performed before the devices exchange timing data. For example, each device may determine the difference between the time that tone A 114 and tone B 116 were received at its respective microphone and then exchange the calculated differences rather than the specific times of arrival that are determined using correlation. This and other variations on the implementation of the particulars of the calculation of the distance based on the times of arrival would be apparent to one of ordinary skill in the art in view of the disclosure herein.

Figure 4:
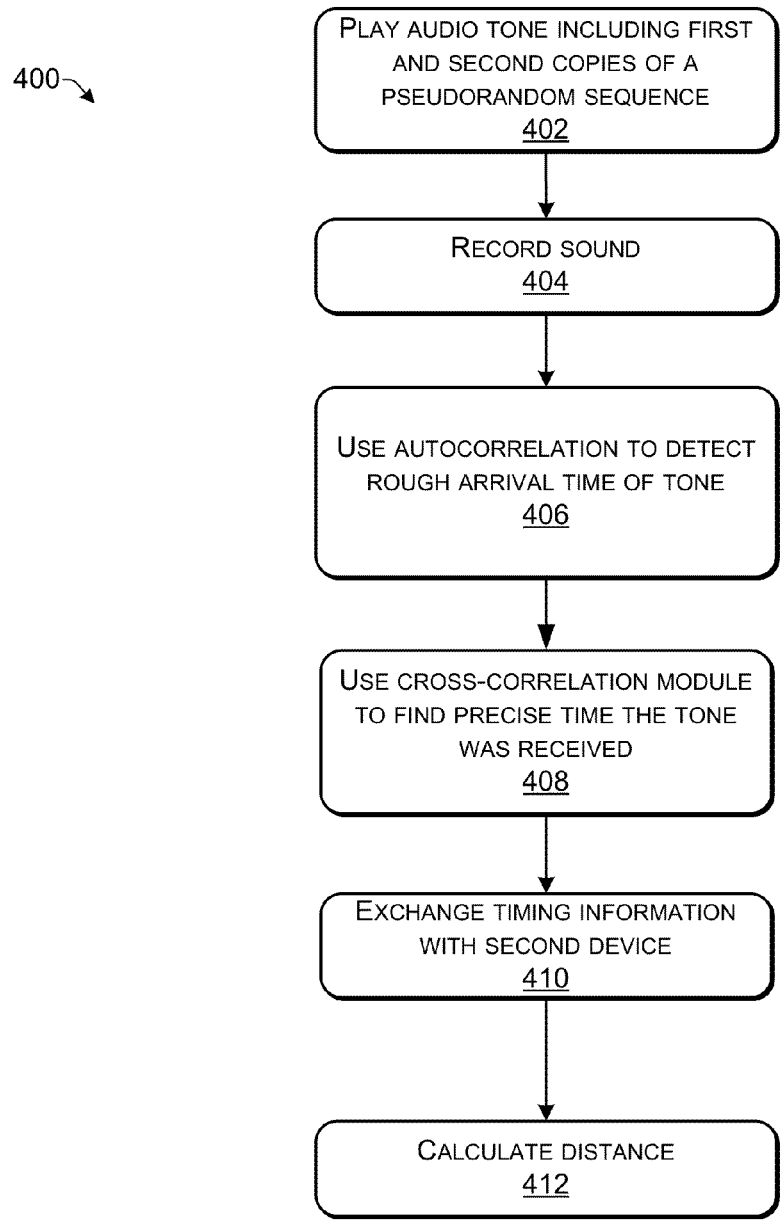
FIG. 4 illustrates an example process flow according to some implementations.

FIG. 4 illustrates an example process flow 400 according to some implementations. In this particular case, the process flow illustrates the process of the first device 102 outputting tone A 114, detecting the timing of tone A at its own microphone 108, exchanging the timing with the second device 104 which provides the timing of tone A at the microphone 108 of the second device 104, and calculating the distance based thereon. In the flow diagrams of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process flow 400 is described with reference to the system 100, described above, although other models, frameworks, systems and environments may implement the illustrated process.

At block 402, the playback module 118 of the first device 102 controls the speakers 106 to play tone A 114 which includes two copies of a pseudorandom sequence.

At block 404, the recording module 120 of the first device 102 controls the microphone 108 to record audio and passes the recorded sound stream 130 to the autocorrelation module 122.

At block 406, the autocorrelation module 122 performs autocorrelation on the recorded sound stream 130 to detect a "rough" arrival time of tone A 114. The determination may be performed in the manner discussed above with respect to FIG. 2. The rough arrival time of tone A 114 is passed to the cross-correlation module 124.

At block 408, the cross cross-correlation module 124 performs cross-correlation to search a relatively small window of the recorded sound stream 130 located around the rough arrival time determined by the autocorrelation module 122 to detect a precise arrival time of tone A 114. The cross correlation determination may be performed in the manner discussed above with respect to FIG. 3. The precise arrival time of tone A 114 is passed to the measurement exchange module 126.

At block 410, the measurement exchange module 126 controls the transceiver 110 to send the precise arrival time of tone A 114 determined by the cross correlation module 124 to the second device 104 and receives a precise time determined by the correlation module 124 of the ranging module 112 of the second device 104 for the arrival time of tone A 114 at the second device 104. As stated above, other information may be exchanged before, during, or after this time. In some embodiments, blocks 404, 406, 408 and 410 may be repeated to ascertain the precise arrival time of tone B 116 at the first device 102 and the second device 104. Having the precise arrival time of both tone A 114 and tone B 116 at the microphones of both the first device 102 and the second device 104 provides the additional benefit that fixed clock synchronization errors between the first device 102 and the second device 104 will be eliminated, as is apparent from equation 5 discussed above. The exchanged and determined information is then passed to the distance calculation module 128 as timing information 136.

At block 412, the distance calculation module 128 receives the timing information 136. The distance calculation module 128 uses the timing information 136 to determine the distance between the first device 102 and second device 104. The calculation of the distance using the timing information 136 may be performed in the manner discussed above with respect to FIG. 1 and using equation 5 discussed above.

The process flow 400 shown in FIG. 4 can be implemented with many variations that would be apparent to one of ordinary skill in the art in view of the disclosure provided herein. One aspect of process flow 400 that can be varied is whether the steps are performed sequentially or in parallel.

Figure 5:
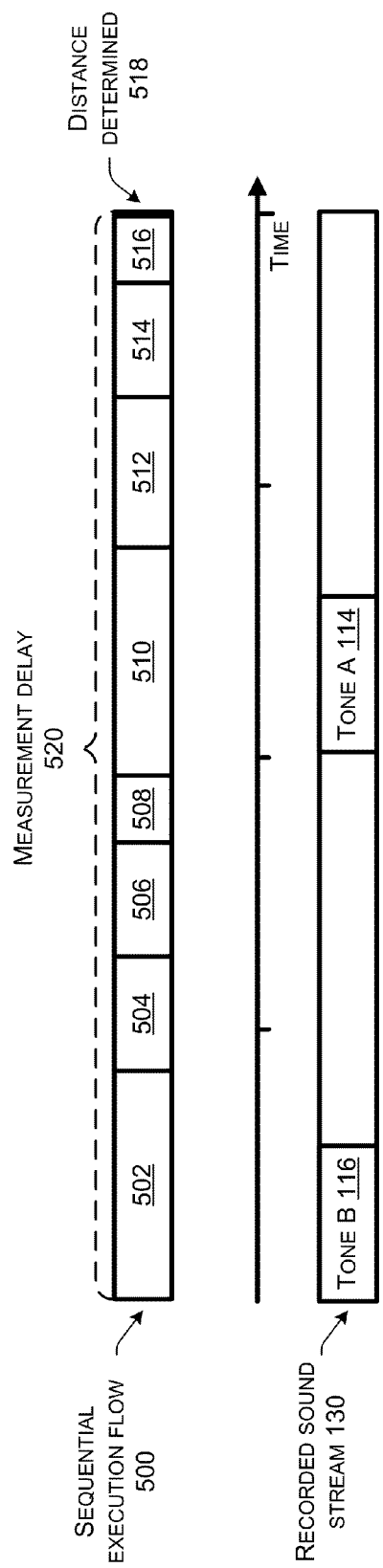
FIG. 5 illustrates an example process execution timing according to some implementations.

FIG. 5 illustrates an execution time diagram 500 of the first device 102 in a sequential implementation. To implement process flow 400 in a sequential manner, the system implements the process using a play and/or record then compute and exchange sequence. The particular implementation shown in FIG. 5 is of a type which alternates between tone B 116 being output by the second device 104 and tone A 114 being output by the first device 102, with each of the first device 102 and the second device 104 using autocorrelation and cross correlation to determine the precise arrival timing of both tone A 114 and tone B 116 at its respective microphone. This is differentiated from other implementations in which a device outputting a particular tone does not determine the precise arrival timing of that tone at its own respective microphone. As mentioned previously, such implementations may rely on other information, such as the time at which the command to output the particular tone was issued.

At 502, the first device 102 records audio for a predetermined amount of time during which the second device 104 outputs tone B 116. At the end of the predetermined amount of time, i.e. at 504, the first device 102 and second device 104 use autocorrelation to detect the rough arrival timing of tone B 116 at their respective microphones. Then, at 506, the first device 102 and second device 104 use cross correlation to detect the precise arrival timing of tone B 116 at their respective microphones. At 508, the first device 102 and second device 104 exchange the precise arrival timings of tone B at their respective microphones. At 510, the first device 102 outputs tone A 114 while recording audio during a predetermined amount of time represented by the width of 510. Next, during 512 and 514, the first device 102 and second device 104 each use autocorrelation and then cross correlation to detect the precise arrival timing of tone A 114 at their respective microphones. Finally, at 516, the first device 102 and second device 104 exchange the precise arrival timings of tone A 114 at their respective microphones and use the precise arrival timings of tone A 114 and tone B 116 at the microphones of the first device 102 and second device 104 to calculate the distance between the devices. Thus, at the end this sequence, indicated by 518, the distance between the devices has been determined. This process would then repeat. The measurement delay 520 for the sequential implementation is shown in FIG. 5 and encompasses the entire width of the execution time diagram shown in FIG. 5. While the sequential implementation described above with respect to FIG. 5 is faster than conventional systems, further improvement is achieved by performing at least some of the operations in parallel. Such a parallel implementation is described with reference to FIG. 6.

Figure 6:
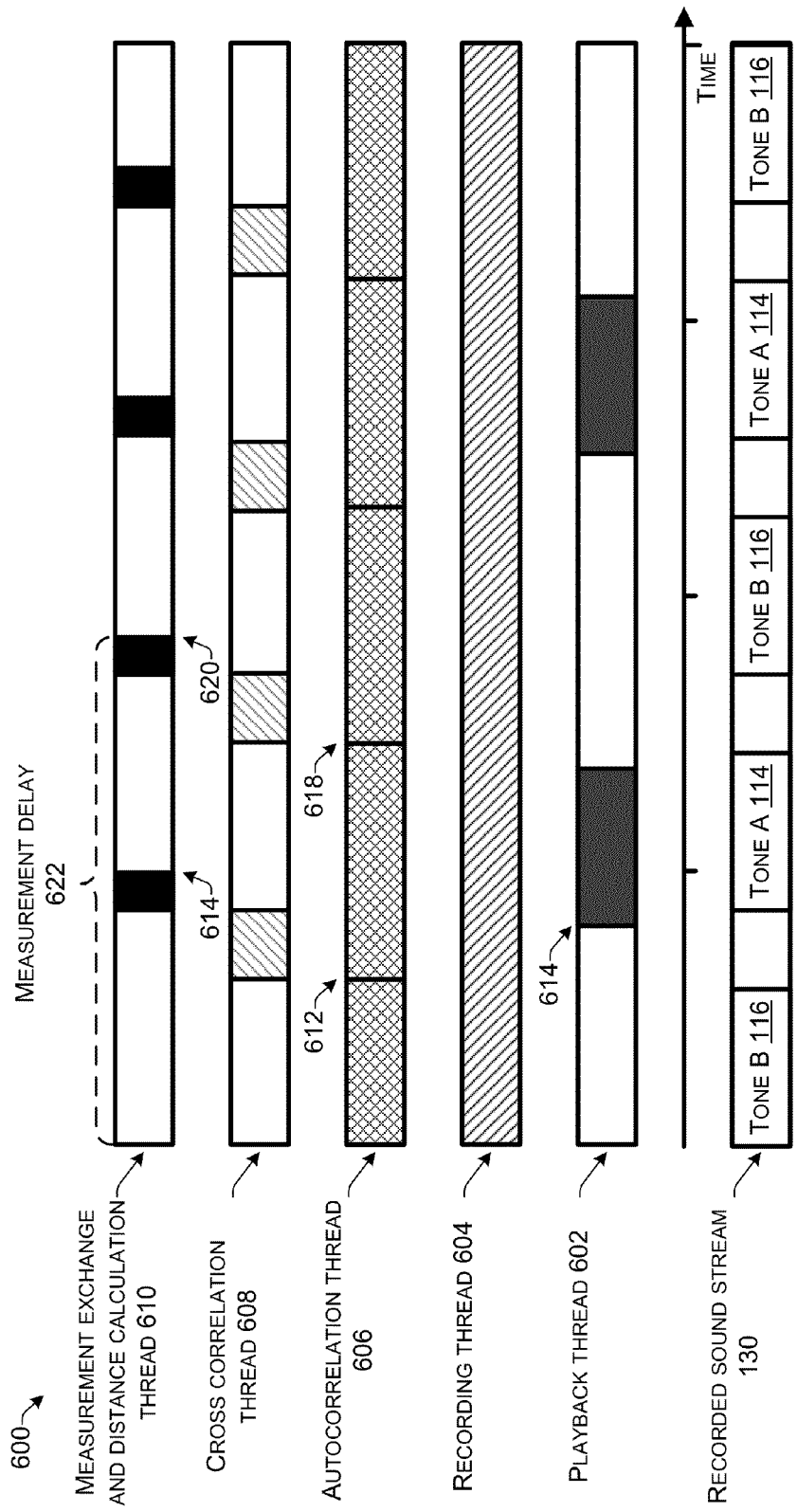
FIG. 6 illustrates an example process execution timing according to some implementations.

FIG. 6 illustrates an example execution time diagram 600 according to some implementations of the first device 102 that include parallel execution of some operations. In particular, in a system operating in the manner shown in FIG. 6, the operations of the ranging module 112 are performed by at least five concurrently executing threads: a playback thread 602, a recording thread 604, an autocorrelation thread 606, a cross correlation thread 608, and a measurement exchange and distance calculation thread 610.

The playback thread 602 is responsible for controlling the speaker 106 to output tone A 114 as described above. Similarly, the recording thread 604 is responsible for controlling the microphone 108 to record audio and for providing the recorded sound stream 130 to the autocorrelation thread 606. One example of concurrency of the playback thread 602 and the recording thread 604 occurs when playback thread 602 controls the speaker 106 of the first device 102 to output tone A 114 while the recording thread 604 controls the microphone to record audio. The concurrency of the playback and recording may also occur in the sequential implementation discussed with respect to FIG. 5 because in the sequential implementation the first device 102 and the second device 104 may each determine the precise arrival timing of both tone A 114 and tone B 116 at their respective microphones. However, the implementations operating in the manner shown in FIG. 6 include further concurrency of operation than those operating as shown in FIG. 5, as will be described below.

The autocorrelation thread 606 operates concurrently with the recording thread 604 such that the recording operation does not stop during the autocorrelation operation. In some implementations, at least the recording thread 604 and the autocorrelation thread 606 operate nearly continuously, if not actually continuously, during the operation of the ranging module 112. The autocorrelation thread 606 detects autocorrelation peaks, e.g. autocorrelation peak 132, and outputs the timing of the detected autocorrelation peaks to the cross correlation thread 608. The autocorrelation thread 606 may operate in the manner discussed above regarding the autocorrelation module 122 of FIG. 1. In FIG. 6, example detections and outputting of the timings of autocorrelation peaks is indicated in FIG. 6 as black vertical lines in the autocorrelation thread 606. The first such detection and output of an autocorrelation peak is indicated as item 612.

Prior to being provided with the timing of an autocorrelation peak by the autocorrelation thread 606, the cross correlation thread 608 may be idle. When the timing of an autocorrelation peak is provided by the autocorrelation thread 606, the cross correlation thread 608 performs cross correlation in a search window surrounding the location in time of the autocorrelation peak 132 to determine a precise arrival time of the tone corresponding to the autocorrelation peak 132 at the microphone in the manner discussed above regarding FIG. 1. Once the precise arrival timing of the tone is determined by the cross correlation thread 608, the timing is provided to the measurement exchange and distance calculation thread 610 which controls the transceiver 110 to exchange the determined precise arrival timing with the second device.

In contrast to FIG. 5, before the cross correlation thread 608 and measurement exchange and distance calculation thread 610 complete the operations for the first tone at the point indicated by item 614, in this case tone B 116, the playback thread 602 begins outputting tone A 114, as indicated by item 616. Though not shown in FIG. 6, the playback thread 602 may even begin outputting tone A 114 prior to the detection of the first autocorrelation peak at 612. Soon after the outputting of tone A 114 begins, the recording thread 604 begins to record tone A 114 and the autocorrelation thread 606 detects the arrival of tone A as a second autocorrelation peak, indicated by item 618. Cross correlation is performed for the second autocorrelation peak by the cross correlation thread 608 and the resulting precise timing is exchanged with the second device 104 by the measurement exchange and distance calculation thread 610. Finally, at the point indicated by item 620, the measurement exchange and distance calculation thread 610 uses the precise arrival times of tone A 114 and tone B 116 at the microphones of the first device 102 and second device 104 to calculate the distance between the devices. As shown in FIG. 6, the process would then repeat. The overall time for measuring the distance between the devices is indicated by item 622.

As stated above, implementations including parallel execution of operations provide benefits over sequential implementations. Specifically, in some implementations, by overlapping of the recording operations with the correlation, exchange and compute operations, the number of distance measurements performed in a set amount of time can be more than double that of sequential implementations using the same calculation techniques. However, as stated previously, while benefits are seen in the parallel implementations, implementations of the described system and method should not be construed as limited to parallel implementations.

As previously mentioned, in motion based applications, the Doppler effect can have an impact on the correlation processes. Doppler effects happen when there is a relative movement between the sound player and recorder. In short, when two devices are moving towards each other, the sound wave will arrive at the recorder earlier than expected so that the recorded tone appears "compressed." Thus, since the recorder is still recording the sound at a constant rate, the recorded sound samples will be shorter than expected. This means, in the recorded version of the tone, the repeating pseudorandom sequences will have a shorter length than the autocorrelation window, i.e. L/2. Thus, the window used in the autocorrelation calculation may be adapted to the length of the compressed sound wave. Similarly, when the phones are moving apart, the tone is "diluted," and thus a longer window may be employed.

To recover the autocorrelation peaks, a method is used to determine the autocorrelation using the appropriate offset between the recorded sound and the delayed sound. In some examples, this is accomplished by determining the autocorrelation using a window size that provides such an offset between the recorded sound and the delayed sound. As an example, in a "compressed" case, the peak can be "recovered" by calculating the autocorrelation on a window of size L/2−1, L/2−2, and so on rather than L/2. In the case of human movement not exceeding 2 m/s, a range of window sizes from L/2−3 to L/2+3, i.e. seven window sizes, recovers most errors due to the Doppler effect. Thus, to provide the maximum likelihood of detecting every tone, a parallel autocorrelator may calculate the autocorrelation for each of the seven window sizes at each time slot. However, while calculating seven autocorrelations for each time slot does provide a greater detection ratio, it also creates a large increase in the computation complexity of the autocorrelator.

Figure 7:
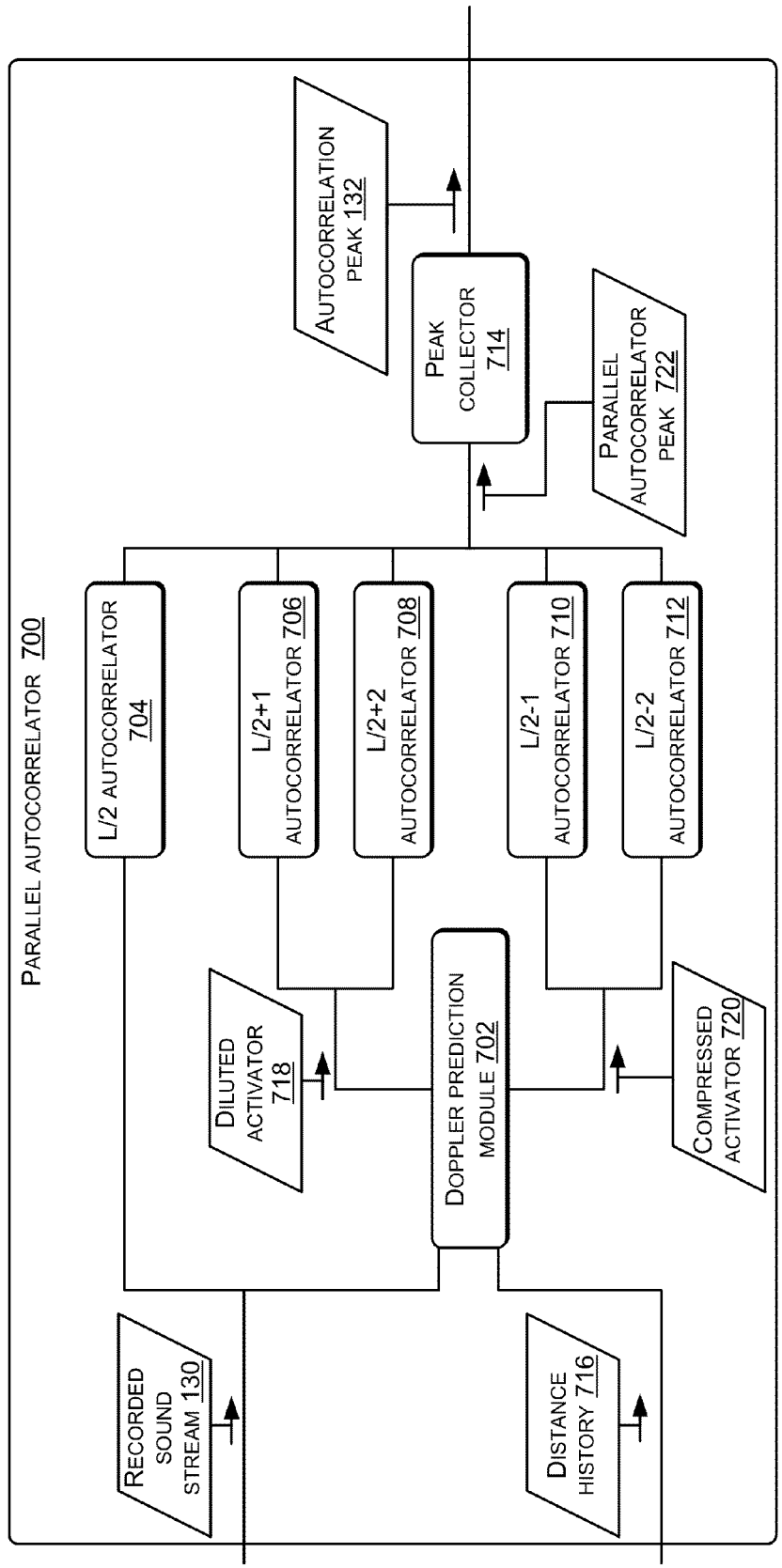
FIG. 7 illustrates an example parallel autocorrelator according to some implementations.

FIG. 7 illustrates a particular implementation of a more efficient parallel autocorrelator 700 which compensates for Doppler effects, specifically a prediction based parallel autocorrelator. The parallel autocorrelator 700 reduces the computational complexity and delay by predicting which of the autocorrelators will be used based on recent changes in the distance between the two devices over time, or based on the current relative speed of the devices. In the implementation shown in FIG. 7, the parallel autocorrelator 700 includes a Doppler prediction module 702, an L/2 autocorrelator 704, an L/2+1 autocorrelator 706, an L/2+2 autocorrelator 708, an L/2−1 autocorrelator 710, an L/2−2 autocorrelator 712, and a peak collector 714. In some examples, the parallel autocorrelator 700 may include additional autocorrelators, such as autocorrelators with L/2+3 and L/2−3 window sizes and so on.

In operation, the Doppler prediction module 702 receives the recorded sound stream 130 and distance history 716. From the distance history 716, the Doppler prediction module 702 predicts the linear speed of the devices relative to one another and therefrom determines whether the sound waves of recorded tones will be compressed or diluted. For example, the Doppler prediction module 702 could estimate the linear speed of the second device 104 relative to the first device 102 based on recent changes in the distance between the devices. If the Doppler prediction module 702 determines that the devices are likely moving away from one another, the Doppler prediction module 702 outputs a diluted activator 718 which activates the L/2+1 autocorrelator 706 and L/2+2 autocorrelator 708. On the other hand, if the Doppler prediction module 702 determines that the devices are likely moving towards one another, the Doppler prediction module 702 outputs a compressed activator 720 which activates the L/2−1 autocorrelator 710 and L/2−2 autocorrelator 712. Depending on whether the diluted activator 718 or the compressed activator 720 is output, Doppler prediction module 702 proceeds to provide the recorded sound stream 130 to the activated autocorrelators. Alternatively, the recorded sound stream 130 could be provided to all the autocorrelators with only the activated autocorrelators using the provided recorded sound stream 130.

During operation, the L/2 autocorrelator 704 and the two activated autocorrelators perform autocorrelation on the recorded sound stream 130 and if a peak is detected, outputs a parallel autocorrelator peak 722 to the peak collector 714. Upon receiving the parallel autocorrelator peak 722, the peak collector 714 outputs the autocorrelation peak 132 as described above with reference to FIG. 1. In some implementations, the information about which autocorrelator found the parallel autocorrelator peak 722 could be included in the information provided to the cross correlation module 124 and the cross correlation module 124 may adapt its operation to take the Doppler effect into account in a manner similar to that described above, such as by using a compressed version of the reference copy of the tone for cross correlation when the autocorrelation peak was detected by the L/2−1 autocorrelator 710 or the L/2−2 autocorrelator 712.

In addition, although the Doppler prediction module described herein may decide only between "diluted" autocorrelators and "compressed" autocorrelators, implementations are not limited to this particular configuration and other configurations would be apparent to one of ordinary skill in the art in view of the disclosure provided herein.

While several examples have been illustrated herein for discussion purposes, numerous other configurations may be used and thus implementations herein are not limited to any particular configuration or arrangement. Some implementations may include an ambient noise and/or multipath filter to mitigate environmental noise such as from shouting, talking and crowd noise as well as to reduce false correlations or interference from multipath effects. In short, low and high pass filters could be used to reduce environmental effects. Each of these environmental factors is common during operation. Additionally, smoothing operations could be performed on the autocorrelation 202 in order to limit issues such as multiple peaks surrounding the locations of the actual peak. Another variation could involve the partial or complete overlap of tone A 114 and tone B 116 in time. Such an implementation may use a variety of adaptations based on the physical properties of sound to minimize the interference of the tones and adaptations of the ranging module 112 to allow correlation operations to still be performed. Adaptations based on the physical properties of sound could include but are not limited to using separate frequencies and selecting the pseudorandom sequences of the tones specifically to minimize interference in the correlation operations that could be caused by overlapping of the tones. Depending on the adaptations of the physical properties of the tones, various adaptations of the ranging module 112 could be implicated. For example, it might be helpful to use dedicated autocorrelation modules or dedicated cross correlation modules for each of tone A 114 and tone B 116 in situations in which the frequencies are different. Even in cases where the autocorrelation module 122 can detect each tone despite a partial overlap with the other tone, for faster detection of the cross correlation peaks, a dedicated cross correlation module could be included for each of the tones.

As previously stated, while several examples have been illustrated herein for discussion purposes, numerous other configurations may be used and thus implementations herein are not limited to any particular configuration or arrangement. For example, the discussion herein refers to signals being output and received by particular components or modules system. This should not be taken as a limitation as such communication need not be direct and the particular components or module need not necessarily be a single functional unit. For example, the measurement exchange module 126 and the distance calculation module 128 are discussed as separate logical components of the system which carry out separate step functions and communicate with each other. This is not to be taken as limiting implementations to only those in which the modules directly send and receive signals to and from one another. The signals could instead be relayed by a separate module upon receipt of the signal. Further, the modules may be combined or the functionality may be separated amongst modules in various manners not limited to those discussed above. Moreover, while specific equations have been provided as examples, implementations are not limited to these specific equations but may instead use other similar calculations. Other variations in the logical and practical structure and framework of various implementations would be apparent to one of ordinary skill in the art in view of the disclosure provided herein.

The processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed. The processes illustrated herein are shown as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed.

Example Computing Device and Environment

Figure 8:
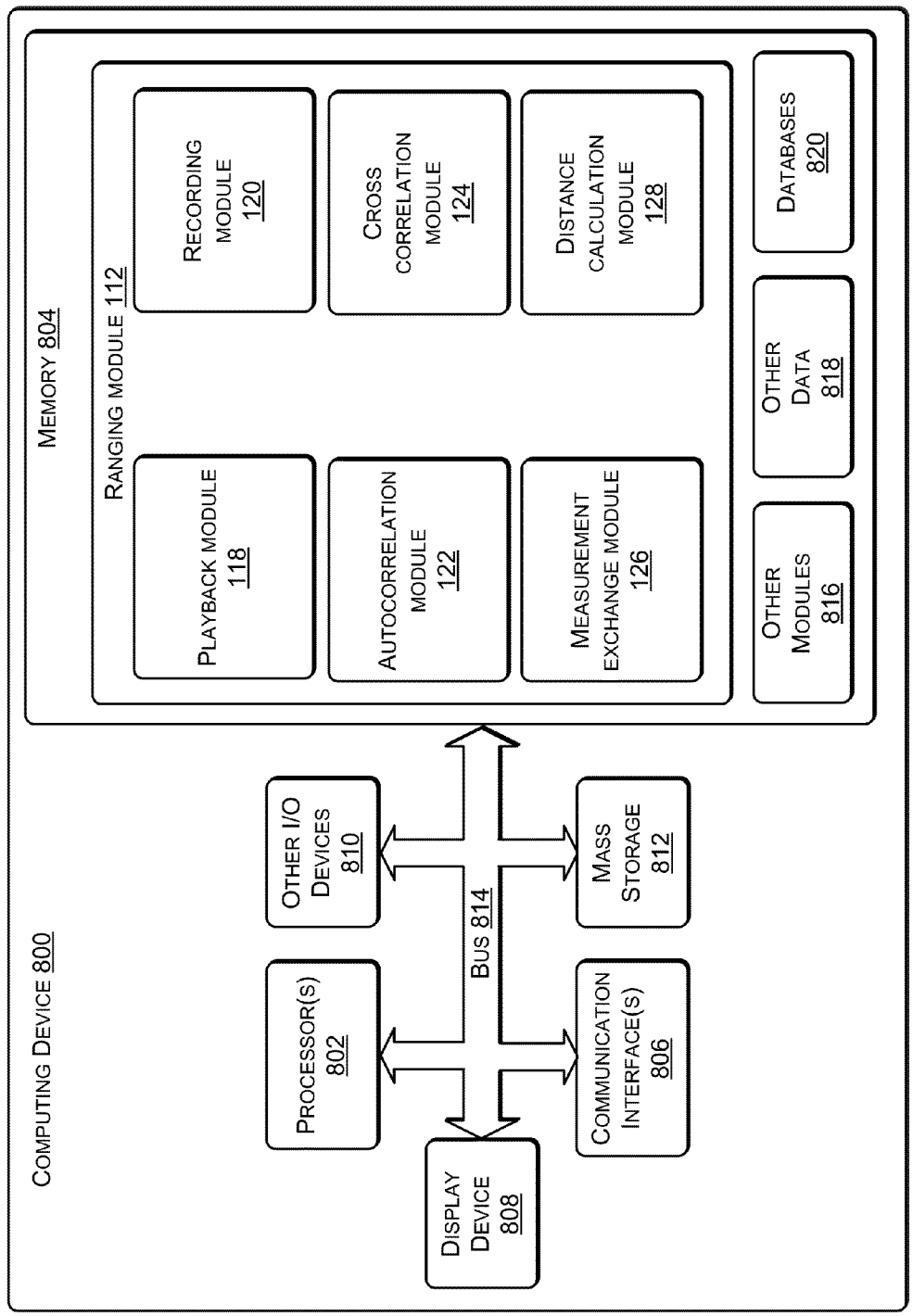
FIG. 8 illustrates an example system in which some implementations may operate.

FIG. 8 illustrates an example configuration of a computing device 800 and an environment that can be used to implement the modules and functions described herein. The computing device 800 may include at least one processor 802, a memory 804, communication interfaces 806, a display device 808 (e.g. a touchscreen display or other display), other input/output (I/O) devices 810 (e.g. a touchscreen display or a mouse and keyboard), and one or more mass storage devices 812, able to communicate with each other, such as via a system bus 814 or other suitable connection.

The processor 802 may be a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media for storing instructions which are executed by the processor 802 to perform the various functions described above. For example, memory 804 may generally include both volatile memory and non-volatile memory (e.g., RAM, ROM, or the like). Further, mass storage devices 812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 808, such as a touchscreen display or other display device, may be included in some implementations. Other I/O devices 810 may be devices that receive various inputs from a user and provide various outputs to the user, and may include a touchscreen, a keyboard, a remote controller, a mouse, a printer, audio and/or voice input/output devices, and so forth.

Memory 804 may include modules and components for the computing device 800 according to the implementations discussed herein. In the illustrated example, memory 804 includes the ranging module 112 of the first device 102 which includes the playback module 118, the recording module 120, the autocorrelation module 122, the cross correlation module 124, the measurement exchange module 126, and the distance calculation module 128 as described above that afford the functionality described herein that can provide fast and accurate distance measurements between computing devices. Memory 804 may further include one or more other modules 816, such as an operating system, drivers, application software, communication software, or the like. Memory 804 may also include other data 818, such as data stored while performing the functions described above and data used by the other modules 816. Memory 804 may also include other data and data structures described or alluded to herein. For example, memory 804 may store the reference copies of tone A 114 and tone B 116 in cases where these tones are predetermined.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 8 as being stored in memory 804 of computing device 800, the ranging module 112, or portions thereof, may be implemented using any form of computer-readable media that is accessible by computing device 800. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Further, although the ranging module 112 is illustrated in FIG. 8 as being stored in memory 804 of computing device 800, in other implementations, the ranging module 112, or portions thereof, may be implemented as an application specific integrated circuit (ASIC) or other form of special purpose computing device and integrated with the other hardware and software components of computing device 800.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:
1. A first device comprising:
one or more processors;
at least one microphone;
at least one speaker; and
one or more computer storage media storing instructions that, when executed by the one or more processors cause the one or more processors to perform acts comprising:
recording, as streaming data, audio received through the at least one microphone;
playing a first audio tone through the at least one speaker;
performing autocorrelation on the streaming data to determine a timing of an autocorrelation peak indicative of a detection of a second audio tone in the streaming data;
performing cross correlation on the streaming data in a search window to determine a timing of a cross correlation peak indicative of the detection of the second audio tone in the streaming data, a location in time of the search window being determined based at least in part on the timing of the detected autocorrelation peak;
transmitting data based on the determined timing of the first cross correlation peak to a second device;
receiving timing data from the second device that is based at least in part on a timing of the second audio tone with respect to the second device; and
calculating a distance between the first device and the second device based at least in part on the timing of the first cross correlation peak and the timing data received from the second device;
wherein at least the acts of recording and performing autocorrelation on the streaming data are performed at least partially in parallel.
2. The first device of claim 1, wherein at least the acts of recording and performing cross correlation on the streaming data are performed at least partially in parallel.

3. The first device of claim 1, wherein the act of performing autocorrelation includes determining a plurality of autocorrelation values for each of a plurality of iterations, each of the plurality of autocorrelation values of each of the plurality of iterations having a respective autocorrelation window width.

4. The first device of claim 3, wherein the autocorrelation window width of at least one of the plurality of autocorrelation values for at least one of the plurality of iterations is determined based at least in part on information indicative of a rate of change in the distance between the first device and the second device.

5. The first device of claim 1, wherein the calculating of the distance between the first device and the second device is further based at least in part on a timing of the first tone with respect to the first device and the timing data received from the second device is further based at least in part on a timing of the first audio tone with respect to the second device.

6. The first device of claim 5, wherein the cross correlation peak is a first cross correlation peak and the timing of the first tone with respect to the first device is a timing of a second cross correlation peak indicative of a detection of the first audio tone at the microphone of the first device.

7. The first device of claim 6, wherein the autocorrelation peak is a first autocorrelation peak, the search window is a first search window, and the timing of the second cross correlation peak is determined by:
performing autocorrelation on the streaming data to determine a timing of a second autocorrelation peak indicative of the detection of the first audio tone in the streaming data;
performing cross correlation on the streaming data in a second search window to determine the timing of the second cross correlation peak indicative of the detection of the first audio tone in the streaming data, a location of the second search window in time being determined based at least in part on the timing of the second autocorrelation peak.

8. The first device of claim 1, wherein the first tone and the second tone at least partially overlap in time.

9. A computer implemented method comprising:
performing, by one or more processors, autocorrelation on streaming data corresponding to recorded sound to determine a timing of an autocorrelation peak indicative of a detection of an audio tone in the streaming data; and
performing cross correlation on the streaming data in a search window to determine a timing of a cross correlation peak indicative of the detection of the audio tone in the streaming data, the location of the search window in time being determined based at least in part on the timing of the detected autocorrelation peak.

10. The computer implemented method of claim 9, further comprising controlling at least one microphone of a first device to record audio received by the at least one microphone as the streaming data.

11. The computer implemented method of claim 10, wherein at least the acts of controlling the at least one microphone of the first device and performing autocorrelation on the streaming data are performed at least partially in parallel.

12. The computer implemented method of claim 10, wherein performing autocorrelation includes determining a plurality of autocorrelation values for each of a plurality of iterations, the plurality of autocorrelation values of each of the plurality of iterations having a respective autocorrelation window width.

13. The computer implemented method of claim 11, wherein the autocorrelation window width of at least one of the plurality of autocorrelation values for at least one of the plurality of iterations is determined based at least in part on information indicative of a rate of change in the distance between the first device and the second device.

14. A first device comprising:
one or more processors; and
one or more computer readable storage media encoded with instructions that, when executed by the one or more processors cause the one or more processors to perform acts comprising:
recording, as streaming data, audio received through at least one microphone of the first device;
performing, at least partially in parallel with the recording, autocorrelation on the streaming data to determine a first timing of a first audio tone in the streaming data;
performing cross correlation on the streaming data in a search window to determine a second timing of the first audio tone in the streaming data, the second timing being more precise than the first timing, the search window having a location in time that is at least partially determined based on the first timing;
transmitting at least one of the first timing or the second timing to a second device;
receiving timing data from the second device that is based at least in part on the second timing of the first audio tone with respect to the second device; and
calculating a distance between the first device and the second device based at least in part on the second timing of the first audio tone in the streaming data and the timing data received from the second device.

15. The first device of claim 14, wherein the performing autocorrelation on the streaming data to determine the first timing of the first audio tone in the streaming data comprises performing autocorrelation on the streaming data to determine a timing of an autocorrelation peak indicative of a detection of the first audio tone in the streaming data; and
wherein the performing cross correlation on the streaming data in the search window to determine the second timing of the first audio tone in the streaming data comprises performing cross correlation on the streaming data in the search window to determine a timing of a cross correlation peak indicative of the detection of the first audio tone in the streaming data.

16. The first device of claim 14, wherein performing autocorrelation includes determining a plurality of autocorrelation values for each of a plurality of iterations, the plurality of autocorrelation values of each of the plurality of iterations having a respective autocorrelation window width.

17. The first device of claim 16, wherein the autocorrelation window width of at least one of the plurality of autocorrelation values for at least one of the plurality of iterations is determined based at least in part on information indicative of a rate of change in the distance between the first device and the second device.

18. The first device of claim 14, the acts further comprising:
playing a second audio tone through at least one speaker of the first device;
wherein the calculating of the distance between the first device and the second device is further based at least in part on a timing of the second audio tone with respect to the first device and the timing data received from the second device is further based at least in part on a timing of the second audio tone with respect to the second device.

19. The first device of claim 15, wherein the cross correlation peak is a first cross correlation peak and a timing of a second audio tone with respect to the first device is a timing of a second cross correlation peak indicative of a detection of the second audio tone at the at least one microphone of the first device.

20. The first device of claim 15, wherein the autocorrelation peak is a first autocorrelation peak, the search window is a first search window, and the timing of a second cross correlation peak is determined by:
  performing autocorrelation on the streaming data to determine a timing of a second autocorrelation peak indicative of the detection of a second audio tone in the streaming data; and
  performing cross correlation on the streaming data in a second search window to determine the timing of the second cross correlation peak indicative of the detection of the second audio tone in the streaming data, the second search window having a location in time that is determined based at least in part on the timing of the second auto correlation peak.

* * * * *